UNITED STATES PATENT OFFICE.

JOSEPH ROSS AND WILLIAM D. CAIRNEY, OF GLASGOW, SCOTLAND.

EXPLOSIVE AND PROCESS OF MAKING SAME.

SPECIFICATION forming part of Letters Patent No. 656,048, dated August 14, 1900.

Application filed December 28, 1899. Serial No. 741,861. (No specimens.)

*To all whom it may concern:*

Be it known that we, JOSEPH ROSS, engineer, and WILLIAM DOUGLAS CAIRNEY, chartered accountant, of 45 Renfield street, in the city of Glasgow, Scotland, have invented certain new and useful Improvements in Explosives, (for which we have obtained a patent in Great Britain, No. 23,442, bearing date the 24th of November, 1899,) of which the following is a specification.

This invention has for its object to provide a safe, cheap, and efficient explosive and one also which will leave no noxious gas after explosion, thereby enabling miners to enter the mine immediately after blasting instead of, as in some cases, several hours after.

In carrying out our invention we take chlorate of potash of the proportion of about eighty-seven per cent., which we pass through a sieve or such like in order to granulate it. This we well mix with about three per cent. of charcoal. We then take about seven per cent. of paraffin or other suitable wax, which we preferably cut up into slices and mix it up with the mixture of chlorate of potash and charcoal until the wax becomes perfectly black. This may be done on a board or dry floor or in any other convenient place. This mixture is then put into a suitable vessel—such, for instance, as a jacketed chamber—which is heated by steam or otherwise and is allowed to remain there until all the wax is melted and the whole mixture is formed into a moist state, somewhat like wet sand. The object of this is to allow the wax to cover the particles of chlorate of potash; but we have found from experience that the wax does not effectually accomplish this, that there are certain parts not covered and little crevices in the compound not filled up, thereby not altogether making the explosive safe. We therefore take vaseline in the proportion of about three per cent. and bring it to a liquid state. This we pour over the whole mixture and stir well together, which completely fills up these crevices and forms a perfect coating over the substance where the wax has failed to do so.

When the cartridges are to be used for mining purposes, the substance or mixture is placed into molds or compressed.

If to be used in a granulated form, the mixture or substance is allowed to cool and rubbed into powder.

Of course it is to be understood that although we have mentioned certain proportions of the different substances these might be slightly varied without deviating from our invention.

We claim—

1. The method of producing an explosive which consists in taking a proportion of chlorate of potash, passing the same through a sieve in order to granulate it, mixing the granulated chlorate of potash with a proportion of charcoal, taking a proportion of wax and mixing it with the mixture of chlorate of potash and charcoal until the wax becomes perfectly black, placing the whole in a vessel, heating the vessel with its contents until the contents become moist with the melted wax, taking a proportion of vaseline, and bringing it to a liquid state, pouring the liquid vaseline over the mixture, and thoroughly stirring the whole mixture together for filling the crevices in the substance to which the paraffin is inaccessible, and providing a coating on the substance which the paraffin has failed to coat.

2. An explosive consisting of a mixture in about the following proportion of ingredients: chlorate of potash, eighty-seven per cent.; charcoal, three per cent.; wax, seven per cent.; vaseline, three per cent.

In testimony whereof we affix our signatures in presence of two witnesses.

J. ROSS.
WM. D. CAIRNEY.

Witnesses:
JOHN LIDDLE,
EDITH MARY EDMONDSTONE.